(12) United States Patent
Hoen

(10) Patent No.: US 6,362,556 B1
(45) Date of Patent: Mar. 26, 2002

(54) ELECTRICALLY ACTUATED OPTICAL SWITCH HAVING A SURFACE PIVOTABLE MIRROR

(75) Inventor: Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/785,004

(22) Filed: Feb. 16, 2001

Related U.S. Application Data

(63) Continuation of application No. 09/281,698, filed on Mar. 30, 1999, now Pat. No. 6,215,222.

(51) Int. Cl.⁷ .......................... G02B 26/00; H02N 1/00
(52) U.S. Cl. ...................................................... 310/309
(58) Field of Search ........................................ 310/309

(56) References Cited

U.S. PATENT DOCUMENTS

| | | | | |
|---|---|---|---|---|
| 5,960,132 A | * | 9/1999 | Lin ............................. | 385/18 |
| 6,215,222 B1 | * | 4/2001 | Hoen .......................... | 310/309 |
| 6,245,590 B1 | * | 6/2001 | Wine et al. ................... | 438/52 |
| 6,262,827 B1 | * | 7/2001 | Ueda et al. .................. | 359/224 |
| 6,275,324 B1 | * | 8/2001 | Sneh ........................... | 359/291 |
| 6,289,145 B1 | * | 9/2001 | Solgaard et al. .............. | 385/17 |
| 6,292,600 B1 | * | 9/2001 | Goldstein et al. ............. | 385/18 |
| 6,300,665 B1 | * | 10/2001 | Peeters et al. ............... | 257/415 |

* cited by examiner

Primary Examiner—Thomas M. Dougherty

(57) ABSTRACT

An optical switch uses a surface electrostatic actuator to mechanically pivot a reflector to selectively redirect a received optical beam. In one application, the optical switch selectively couples a first optical fiber to a second optical fiber. The electrostatic actuator includes first and second members that are separated by a short distance. The opposing surfaces of the two members include a number of drive electrodes. These electrodes generate electrostatic forces which induce lateral displacement when the electrostatic forces are modified. The modification of the electrostatic forces is accomplished by reconfiguring a voltage pattern of the drive electrodes. The lateral displacement pivots the reflector, which is mechanically attached to the first member. The pivoting occurs along a pivot region that is generally parallel to the surfaces of the first and second members. The first member may be a stator, while the second member may be a translator that controls pivoting of an internal micromirror.

17 Claims, 19 Drawing Sheets

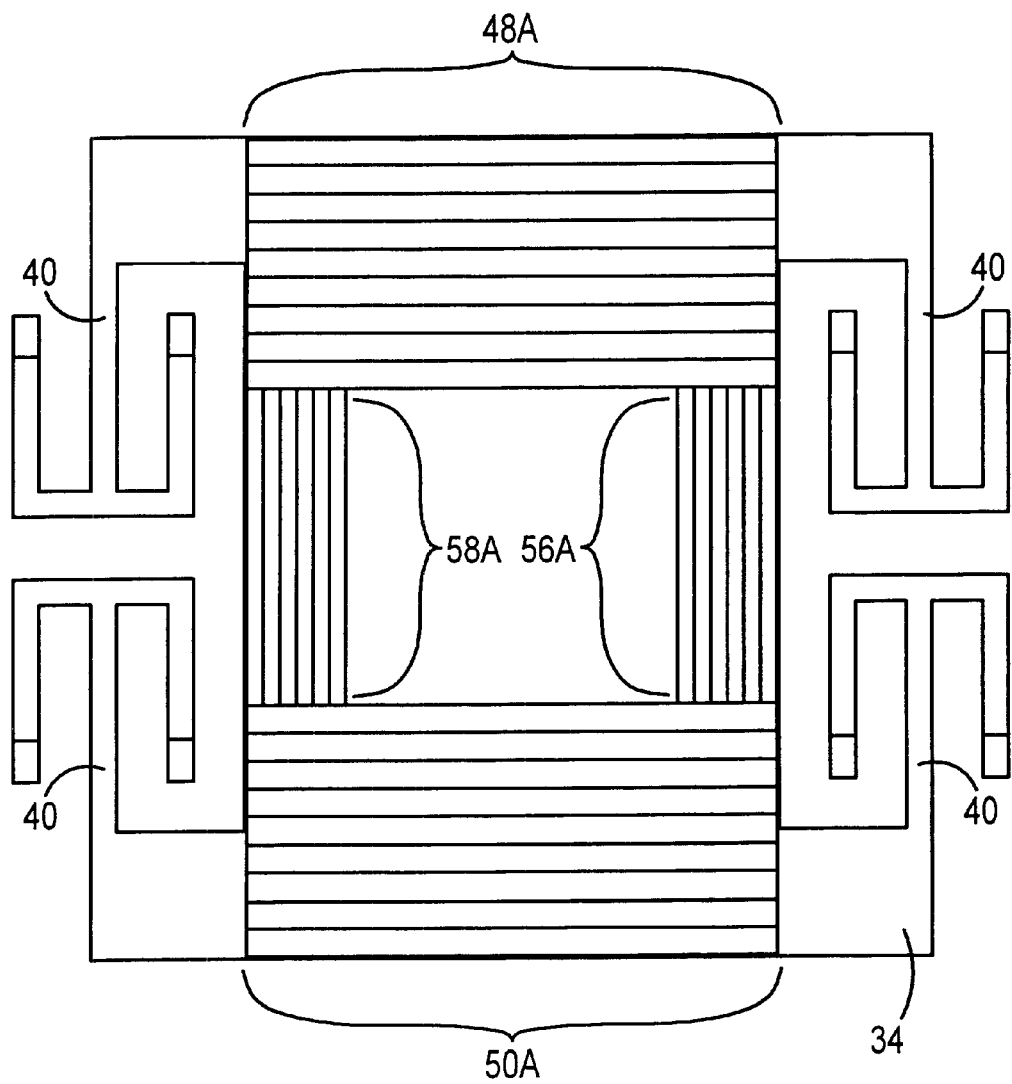
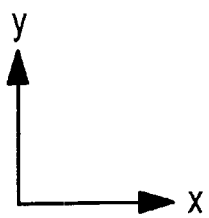
FIG. 7

ELECTRICALLY ACTUATED OPTICAL SWITCH HAVING A SURFACE PIVOTABLE MIRROR

CROSS REFERENCE TO RELATED APPLICATION

This application is a continuation of Ser. No. 09/281,698, filed Mar. 30, 1999, now U.S. Pat. No. 6,215,222.

TECHNICAL FIELD

The invention relates generally to optical switches and more particularly to an optical switch having micromachine-actuated mirrors.

DESCRIPTION OF THE RELATED ART

Continuing innovations in the field of fiber optic technology have contributed to the increasing number of applications of optical fibers in different technologies. With the increased utilization of optical fibers, there is a need for efficient peripheral devices that assist in the transmission of data through these optical fibers, such as optical switches. An optical switch operates to selectively couple an optical fiber to one of two or more alternative optical fibers such that the two coupled optical fibers are in communication with each other.

The coupling of the optical fibers performed by an optical switch can be effectuated through various methods. One method of interest includes using a mirror that is placed in front of an input optical fiber to reflect optical signals from the input optical fiber to at least one of two output optical fibers. The input and output optical fibers may be either uni-directional or bi-directional fibers. In the simplest implementation of the mirror method, the input optical fiber is aligned with one of two output optical fibers, such that when the mirror is not placed in an optical path between these two aligned optical fibers, the two aligned optical fibers are in a communicating state. However, when the mirror is placed between the two aligned optical fibers, the mirror steers, i.e., reflects, optical signals from the input optical fiber to the other output optical fiber. The positioning of the mirror in and out of the optical path between the two aligned optical fibers can be accomplished by using an apparatus that mechanically moves the mirror to a desired position.

U.S. Pat. No. 5,208,880 to Riza et al. describes an optical switch that utilizes a piezoelectric actuator to displace a mirror to selectively couple an input optical fiber to a particular output optical signal. The piezo-electric actuator of Riza et al. includes a number of piezoelectric bars, also known as unimorphs, to linearly displace the mirror. In a first embodiment, the optical switch of Riza et al. includes N output optical fibers that are positioned perpendicularly to an input optical fiber in a side-by-side configuration. The mirror is positioned on the axis of the input optical fiber and has a reflective surface that is orientated to direct optical signals from the input optical fiber at a right angle. The mirror is coupled to the piezoelectric actuator that is able to displace the mirror along the axis of the input optical fiber to couple the input optical fiber to any one of the output optical fibers. In operation, the piezoelectric actuator linearly displaces the mirror to a location where the axis of the input optical fiber intersects an axis of a preselected output optical fiber. The mirror at the intersecting location reflects optical signals from the input optical to the preselected output optical fiber and reflects optical signals from the preselected output optical fiber to the input optical fiber. The input optical fiber can be optically coupled to another output optical fiber by linearly displacing the mirror to a new location, where the axis of the input optical fiber intersects an axis of the to-be-coupled output optical fiber.

In a second embodiment, the optical switch of Riza et al. is configured to accommodate two input optical fibers and two output optical fibers. The optical fibers are positioned in an "X" configuration such that two output optical fibers are located in the upper portion of the configuration and the two input optical fibers are located in the lower portion of the configuration. In this embodiment, the optical switch of Riza et al. includes a thin mirror that has reflective surfaces on both sides. The mirror can be positioned in the optical paths between the optical fibers by the piezoelectric actuator such that when the mirror is displaced to the center of the "X" configuration, the lower left optical fiber is coupled to the upper left optical fiber and the lower right optical fiber is coupled to the upper right optical fiber (the "reflective state"). However, when the mirror is removed from the optical paths, the lower left optical fiber is coupled to the upper right optical fiber and the lower right optical fiber is coupled to the upper left optical fiber (the "passive state").

U.S. Pat. No. 5,042,889 to Benzoni describes an optical switch that also uses a mirror to switch optical paths between optical fibers. In an exemplary embodiment, the optical switch of Benzoni is configured to accommodate four optical fibers that are positioned in the above-described "X" configuration. In contrast to the optical switch of Riza et al., the optical switch of Benzoni utilizes an electromagnetic mechanism, instead of a piezoelectric actuator, to move the mirror in and out of the optical paths between the optical fibers. The electromagnetic mechanism operates to create an attractive magnetic force between the mechanism and the mirror. The upper section of the mirror includes a ferromagnetic material that becomes attracted to the electromagnetic mechanism when the magnetic force is generated. The electromagnetic mechanism is located above the mirror to lift the mirror when the mechanism is activated. Initially, the mirror is positioned between the optical paths such that the four optical fibers are coupled in the reflective state. When the electromagnetic mechanism is activated, the attractive magnetic force causes the mirror to be lifted out of the optical paths to set the optical fibers in the passive state.

Although the known optical switches operate well for their intended purpose, what is needed is an optical switch that includes a compact actuator to precisely position an associated mirror using low operating voltage, so that the actuator is compatible with complementary metal-oxide semiconductor (CMOS) circuitry.

SUMMARY OF THE INVENTION

An optical switch uses a surface electrostatic actuator to mechanically pivot a reflector about a pivot region that is substantially parallel to the drive surfaces of the actuator. The pivoting reflector selectively redirects an optical beam. In one application, the electrostatic actuator and the reflector form a switching device to redirect optical signals between two optical fibers such that the two optical fibers are in communication.

The optical coupling of the optical fibers is accomplished by pivoting the reflector from a non-reflective orientation to a reflective orientation. The non-reflective orientation is the position of the reflector in which the reflecting surface of the reflector is generally parallel to the upper surface of a first member, which may be stationary (i.e., a stator). When the reflector is in the non-reflective orientation, any optical signal that propagates through the switch is allowed to continue propagation in the original direction. The reflective orientation is the position of the reflector in which the reflecting surface is perpendicular to the upper surface of the first member. In this orientation, the reflector redirects any optical signal that propagates through the switch, thereby optically coupling two optical fibers that have axes that intersect at the location of the reflector.

The electrostatic actuator includes the first member and a second member which are separated by a short distance. The second member is configured to include a number of flexures that are attached to supports on the first member. The flexures allow the second member to be displaced laterally, i.e., to be a translator that moves in the direction parallel to the upper surface of the first member.

The reflector is attached to the upper surface of the first member in a manner to allow the reflector to be pivoted between the non-reflective orientation and the reflective orientation. In addition, the reflector is mechanically attached to the second member. The mechanical connection of the reflector and the second member permits the reflector to be pivoted when the second member is laterally displaced. In one embodiment, the reflector is a micromirror that resides within an interior region of the second member.

The opposing surfaces of the first and second members include electrodes that generate electrostatic forces to laterally displace the second member. The electrodes are thin strips of conductive materials that are aligned in a parallel fashion. These electrodes are positioned such that the lengths of the electrodes are perpendicular to the travel direction of the first member.

The drive electrodes are electrically coupled to one or more voltage sources that are used to provide an adjustable pattern of voltages to at least one set of drive electrodes in order to change the electrostatic forces that are generated between the sets of drive electrodes. As an example, the first set of drive electrodes may be electrically connected to a voltage source that provides a fixed pattern of voltages to the electrodes. In this example, the second set of drive electrodes may be electrically connected to a microcontroller that contains a voltage source. The microcontroller operates to provide voltages to the second set of drive electrodes in a predetermined voltage pattern. However, the microcontroller is able to reconfigure the voltage pattern by selectively applying different voltages to some of the drive electrodes of the first set. The reconfiguration of the voltage pattern modifies the electrostatic forces between the first and second members, thereby laterally displacing the second member.

In one embodiment of the optical switch, the second member (translator) includes an opening located near the center of the second member. The opening is of sufficient size to allow the reflector (micromirror) to be positioned within the opening. As the second member is laterally displaced relative to the first member (stator), the reflector pivots out of the opening to the reflective orientation. In a second embodiment of the optical switch, the reflector is located in front of the second member. In both embodiments, the reflector is attached to the second member by two actuation arms that pivot the reflector when the second member is laterally displaced.

An advantage of the invention is that the design of the electrostatic actuator and the reflector allows the optical switch to be manufactured as a micromachine. In addition, the electrostatic actuator has a low operating voltage such that the electrostatic actuator is compatible with complementary metal-oxide semiconductor (CMOS) circuitry.

BRIEF DESCRIPTION OF THE DRAWINGS

FIG. 7 is a bottom view of a translator of the switching device of FIG. 2, illustrating the configuration of translator electrodes on the lower surface of the translator.

DETAILED DESCRIPTION

Figure 1:
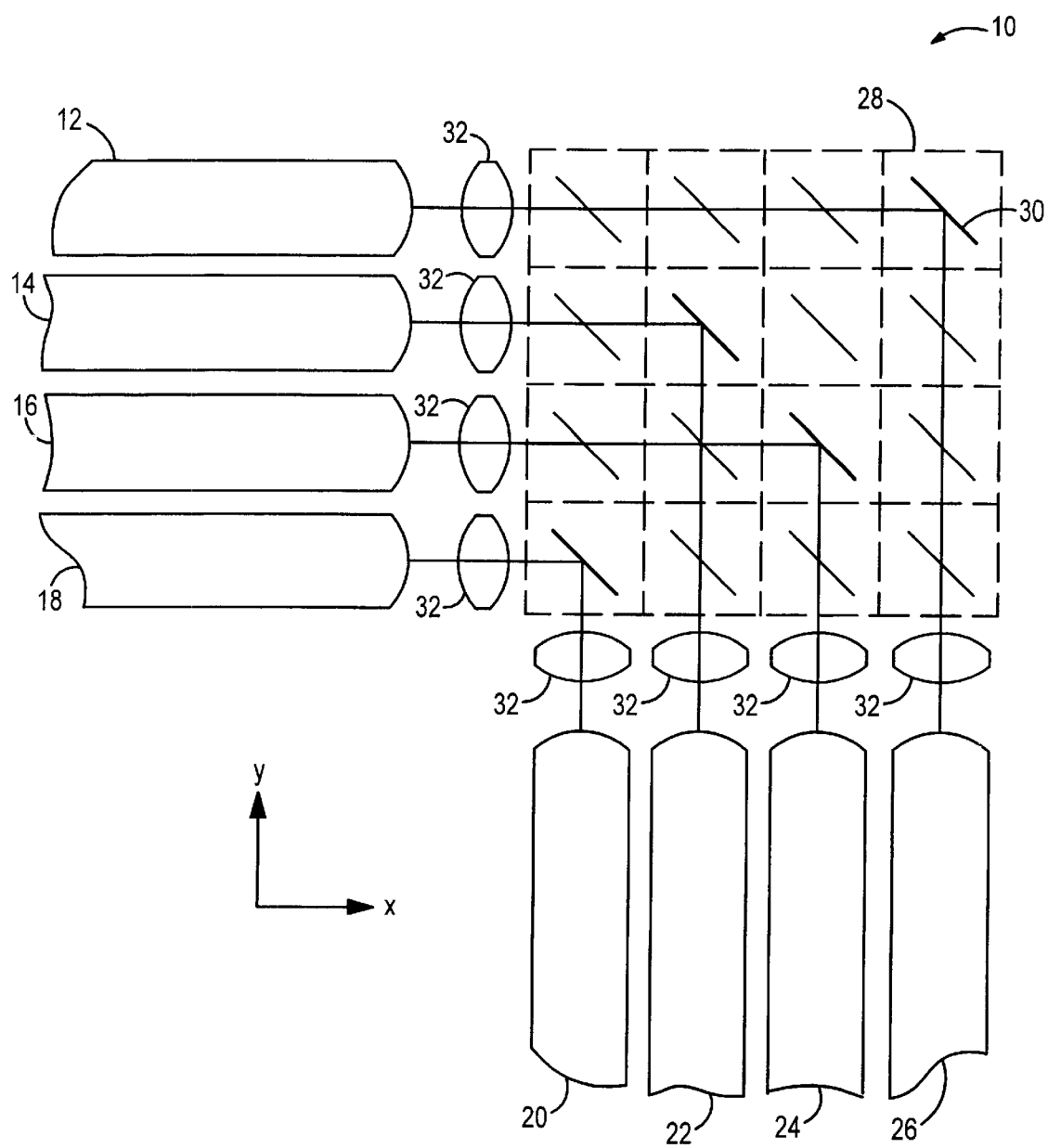
FIG. 1 is a schematic diagram of an optical switch having a number of switching devices in accordance with the present invention.

With reference to FIG. 1, an exemplary optical switch 10 in accordance with the present invention is shown. The optical switch 10 operates to selectively couple the optical fibers 12, 14, 16 and 18 to optical fibers 20, 22, 24 and 26, such that each one of the optical fibers 12–18 is in communication with one of the optical fibers 20–26. The optical fibers 12–26 may be uni-directional or bi-directional optical fibers. The type of optical fibers 12–26 is not critical to the invention.

The optical switch 10 includes a number of switching devices 28 that can redirect optical signals when activated. The exact number of the switching devices in the optical switch can vary, depending on the number of optical fibers being coupled by the optical switch and the number of possible coupling configurations of the optical switch. As shown in FIG. 1, the optical switch contains sixteen switching devices in a 4×4 arrangement. Each switching device includes a micromirror 30 that can be perpendicularly positioned (the "reflective orientation") with respect to the XY plane to reflect an optical signal from one of the optical fibers 12–18 to one of the optical fibers 20–26. The reflective orientation of the micromirror is induced when the embodying switching device is activated. When deactivated, the micromirror is positioned generally parallel (the "non-reflective orientation") to the XY plane such that an optical signal is transmitted through the embodying switching device without being deflected by the device. By selectively activating four switching devices, each optical fiber 12–18 can be coupled to a particular optical fiber 20–26.

In FIG. 1, the four activated switching devices 28 are identified by thicker lines, representing that the micromirrors 30 are in the reflective orientation. Each activated switching device optically couples an optical fiber 12–18 that is aligned laterally with that device to an optical fiber 20–26 that is aligned vertically with that device. The activated switching devices have been selected to optically couple the optical fibers 12, 14, 16 and 18 to the optical fibers 26, 22, 24 and 20, respectively.

The optical switch 10 also includes lenses 32 positioned between each optical fiber 12–26 and the optical switch. The lenses operate to focus the optical signals that have emanated from the optical fibers 12–26 and to refocus the optical signals prior to entering the optical fibers 12–26. The lenses are not critical to the operation of the optical switch.

Figure 2:
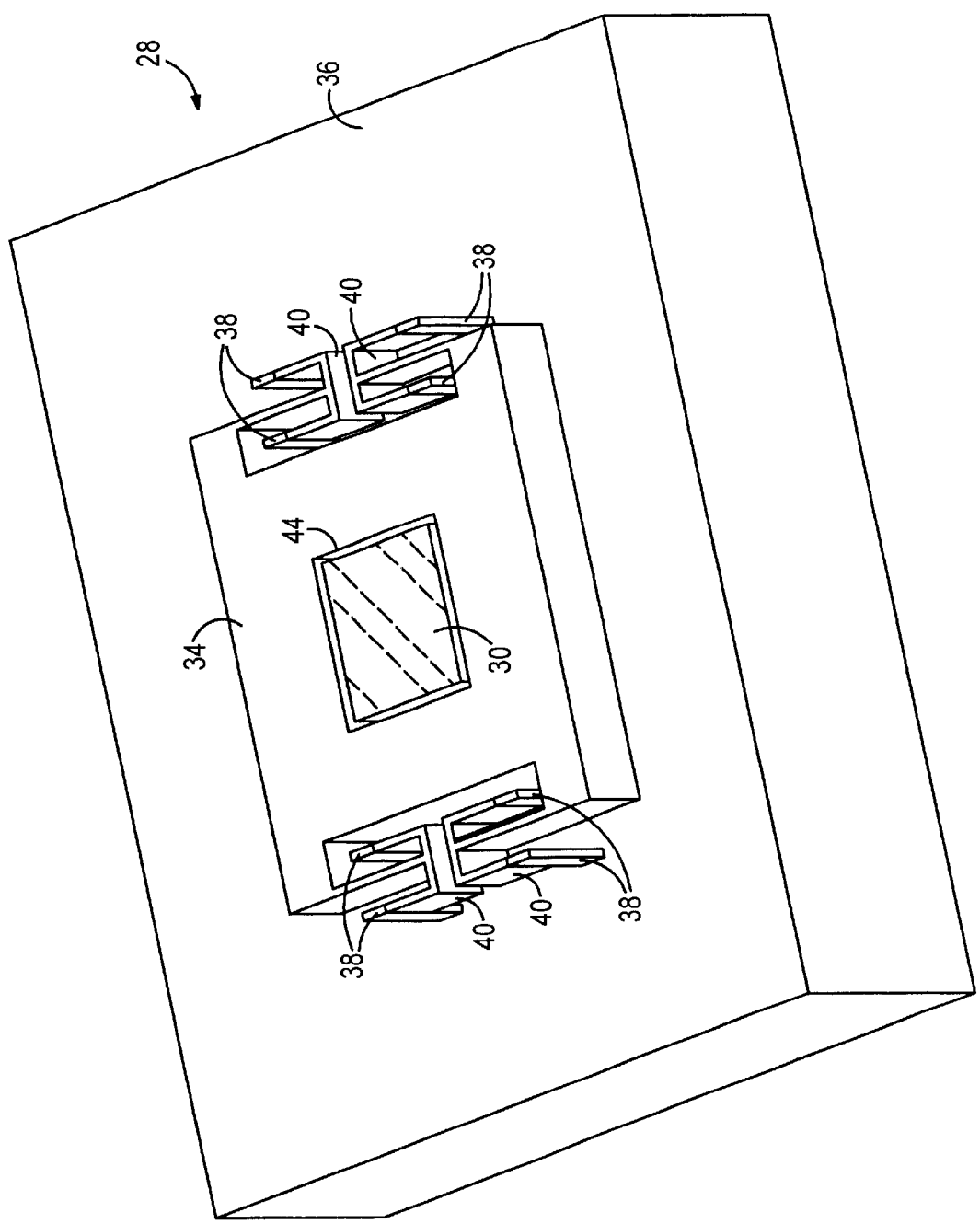
FIG. 2 is a perspective view of a switching device in accordance with a first embodiment of the present invention.

Turning to FIG. 2, a switching device 28 of the optical device 10 in accordance with a first embodiment is shown. The switching device includes a translator 34 and a micromirror 30 that are attached to a stator 36. The translator and the stator may be made of silicon. The micromirror may also be made of silicon with a layer of Au for the reflective surface. The translator is attached to the stator by eight translator supports 38. The translator supports are affixed to the upper surface of the stator and to one of four E-shaped flexures 40 of the translator. The flexures allow the translator to move in the X-direction, while the stator remains stationary. As an example, the flexures may have a thickness of 2 $\mu$m and a depth of 100 $\mu$m.

Figure 3:
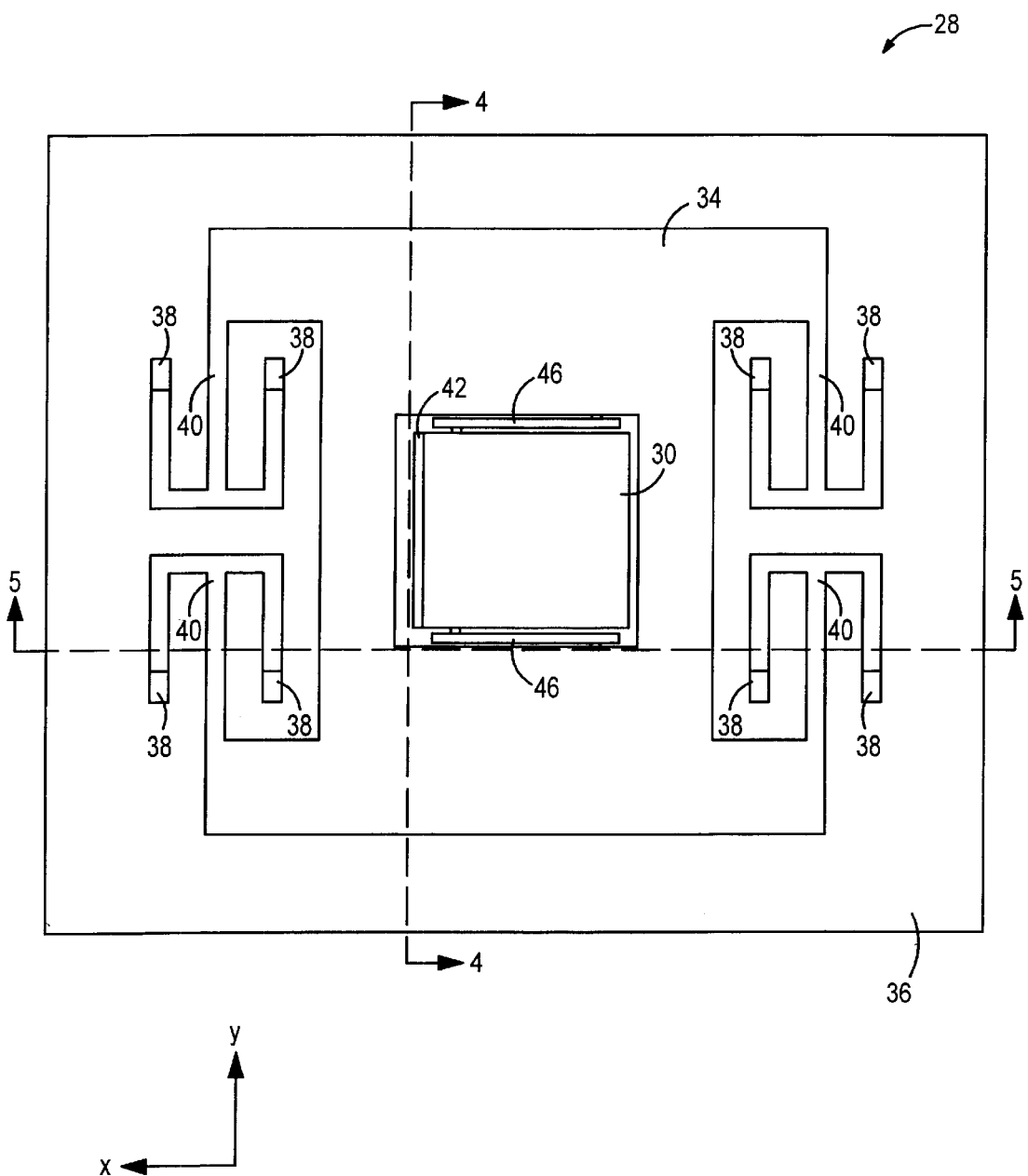
FIG. 3 is a top view of the switching device of FIG. 2.

The micromirror 30 is attached to the stator 36 by a pivoting strip 42 (not shown in FIG. 2) that allows the micromirror to rotate about the side of the micromirror that is affixed to the strip. The pivoting strip may be a thin film of silicon nitride (SiN). The material utilized to form the pivoting strip is not critical to the invention. The translator 34 includes an opening 44 that provides enough space for the micromirror to pivot from the non-reflective orientation, i.e., the orientation shown in FIG. 2, to the reflective orientation, i.e., a vertical orientation such that the micromirror is parallel to the YZ plane. The micromirror is also attached to the translator, as shown in FIG. 3. The physical attachment of the micromirror to the translator allows the micromirror to be pivoted by a lateral displacement of the translator.

The translator 34 and the stator 36 form an electrostatic surface actuator that operates to pivot the micromirror 30 to either the reflective or non-reflective orientation. The translator 34 and the stator 36 both include electrodes (shown in FIGS. 6 and 7) located on the opposing surfaces of the translator and the stator. When the electrostatic actuator is activated, the electrostatic forces created by applying voltages to the electrodes of the translator and the stator can be manipulated to laterally displace the translator with respect to the stator in the X-direction. The displacement operation of the translator and the stator will be described below. The lateral movement of the translator pivots the micromirror from the non-reflective orientation to the reflective orientation. When deactivated, the translator is designed to move in the negative X-direction back to the original position. This reverse displacement of the translator pivots the micromirror from the reflective orientation to the non-reflective orientation. The pivoting of the micromirror will be further described below.

Figure 4:
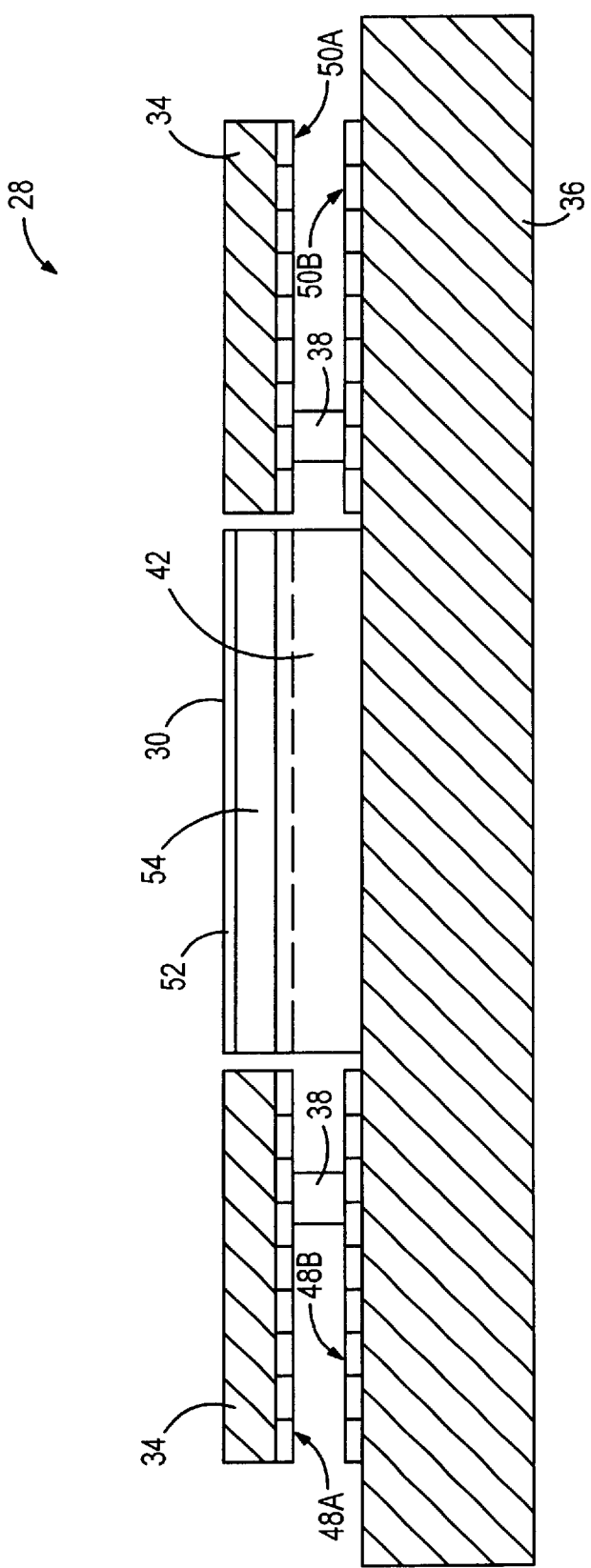
FIG. 4 is a first cross-sectional view of the switching device of FIG. 2.
Figure 5:
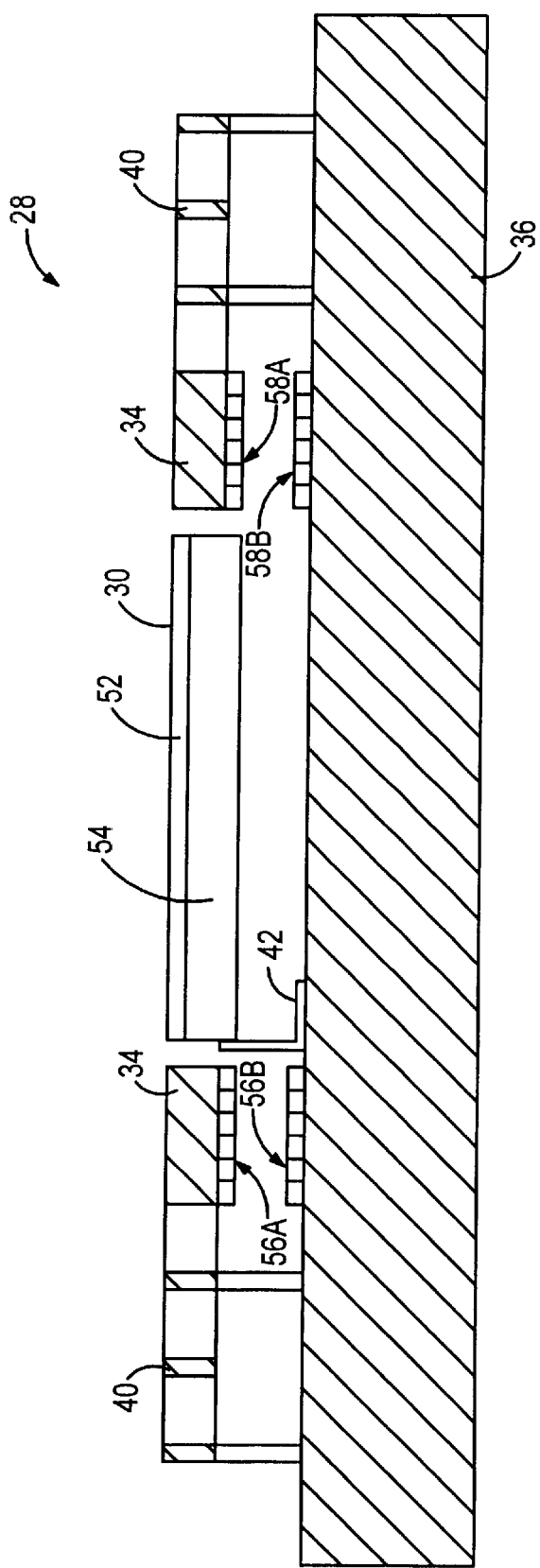
FIG. 5 is a second cross-sectional view of the switching device of FIG. 2.

In FIGS. 3–7, various views of the switching device 28 are shown. FIG. 3 is a top view of the switching device. Shown in FIG. 3 are actuation arms 46 that pivot the micromirror 30 when the translator 34 is laterally displaced. FIGS. 4 and 5 are cross-sectional views of the switching device. The locations of the cross-sections depicted in FIGS. 4 and 5 are shown in FIG. 3. In FIG. 4, four sets of levitator electrodes 48A, 50A, 48B and 50B are depicted. The levitator electrodes 48A and 50A are attached to the bottom surface of the translator 34, while the levitator electrodes 48B and 50B are attached to the upper surface of the stator 36. Each levitator electrode is a thin strip of conductive material that is parallel to the other levitator electrodes in the set. The exact number of the levitator electrodes included in the switching device is not critical to the invention. These electrodes generate electrostatic forces that do not contribute to laterally displace the translator 34. Instead, the electrodes operate to provide "levitation" forces that are normal to the opposing surfaces of the translator 34 and the stator 36. The levitator electrodes 48A and 48B generate a first set of repulsive forces and the levitator electrodes 50A and 50B generate a second set of repulsive forces. These repulsive forces oppose a close proximity approach of the translator to the stator. Also shown in FIG. 4 are a reflective layer 52 and a mirror substrate 54 of the micromirror 30. A portion of the mirror substrate is visually obstructed by the pivoting strip 42 that affixes the micromirror to the stator. The obstructed lower surface of the mirror substrate is illustrated in FIG. 4 by the dotted line.

In FIG. 5, a second cross-sectional view of the switching device 28 is shown. For simplification, the actuation arm 46 is not shown in FIG. 5. In this view, one side of the micromirror 30 is clearly illustrated, depicting the reflective layer 52 and the mirror substrate 54 of the micromirror. Furthermore, the pivoting strip 42 that connects the micromirror to the stator 36 is shown in an exemplary arrangement. The exemplary pivoting strip 42 has an "L" configuration in which a horizontal portion of the pivoting strip is attached to the stator and an upper portion of the pivoting strip is attached to the micromirror. Other configurations for the pivoting strip include having the horizontal portion of the pivoting strip in front of the micromirror, instead of beneath the micromirror and/or having the upper attached portion of the pivoting strip on the lower surface of the micromirror. The micromirror is positioned in the non-reflective orientation, as shown in FIG. 5. In this orientation, the micromirror is co-planar with the upper surface of the translator 34 and consequently, parallel to the upper surface of the stator.

Also shown in FIG. 5 are two sets of drive electrodes 56A and 58A and two sets of stator electrodes 56B and 58B. The drive electrodes 56A and 58A are located on the bottom surface of the translator 34, while the drive electrodes 56B and 58B are located on the upper surface of the stator 36. These drive electrodes generate the electrostatic forces that will laterally displace the translator 34, thereby pivoting the micromirror 30. The generation of the electrostatic forces by the drive electrodes will be described below. Each drive electrode is a thin strip of conductive material that is parallel to the other drive electrodes in the set.

In the preferred embodiment, a thin layer of insulating material (not shown) is located between the translator electrodes 48A, 50A, 56A and 58A and the translator 34. Similarly, another layer of insulating material (not shown) is located between the stator electrodes 48B, 50B, 56B and 58B and the stator 36. These layers electrically isolate each electrode, so that electrical charge on a particular electrode is not lost to another electrode via the stator or the translator.

Figure 6:
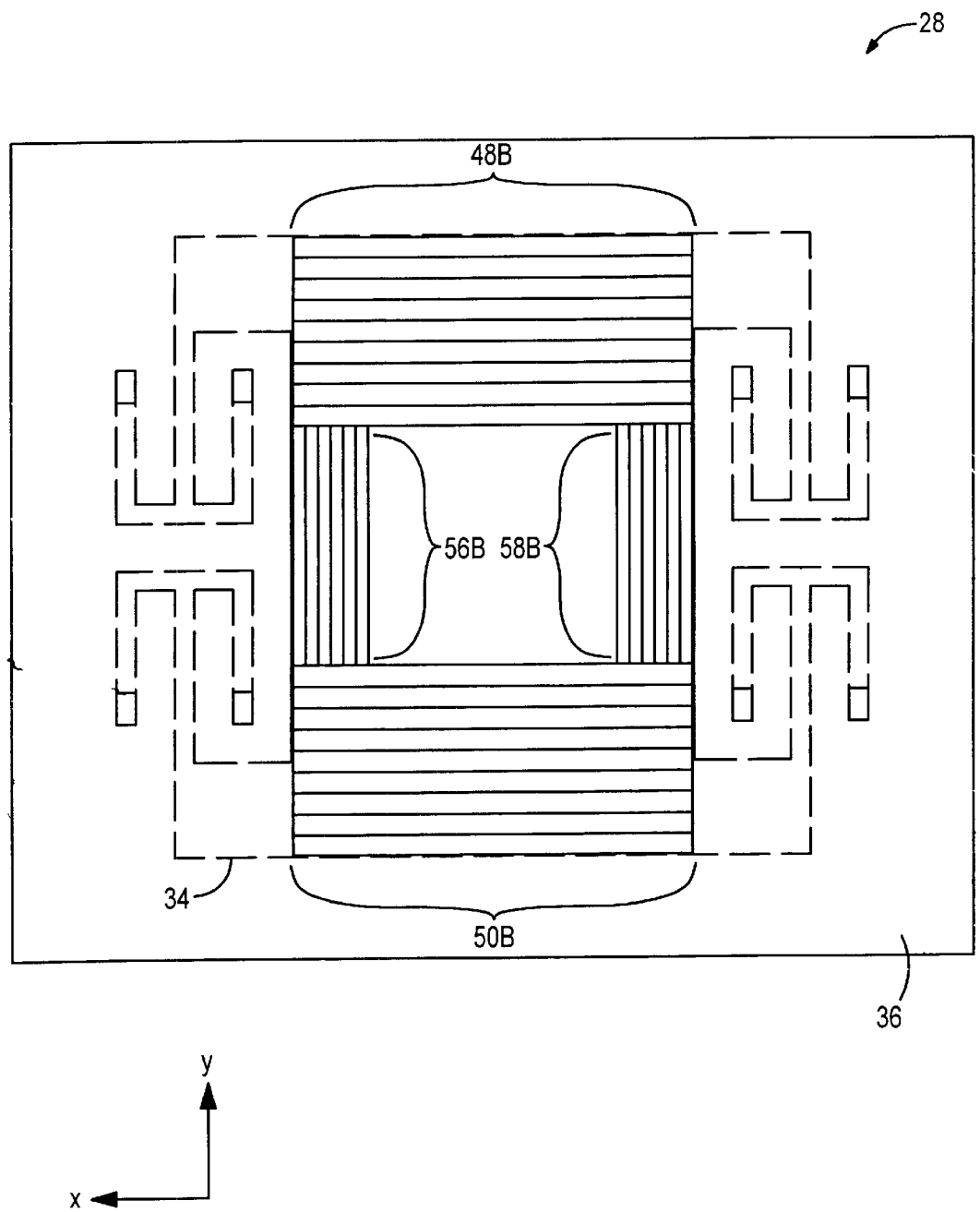
FIG. 6 is a top view of a stator of the switching device of FIG. 2, illustrating the configuration of stator electrodes on the upper surface of the stator.

Turning to FIG. 6, the upper surface of the stator 36 is shown. A dotted outline of the translator 34 is depicted on the surface of the stator 36 to illustrate the position of the translator 34 with respect to the electrodes 48B, 50B, 56B and 58B of the stator. In FIG. 7, the lower surface of the translator 34 is shown. The translator electrodes 48A, 50A, 56A and 58A are positioned in a mirror image of the stator electrodes 48B, 50B, 56B and 58B. Therefore, the translator electrodes 48A, 50A, 56A and 58A will be situated directly above the stator electrodes 48B, 50B, 56B and 58B, respectively, in the switching device 28.

The electrostatic forces that laterally displace the translator 34 are generated by the translator drive electrodes 56A and 58A and the stator drive electrodes drive 56B and 58B. The electrostatic forces between the opposing drive electrodes 56A and 56B are generated by applying different voltages to these electrodes. The electrostatic forces between the opposing electrodes 58A and 58B are generated in an identical manner. By varying the electrostatic forces between these drive electrodes, the translator 34 can be displaced in a predetermined direction. In order to ensure that the generated electrostatic forces will be optimal for laterally displacing the translator 34, it is desirable to keep the ratio of the repeat distance associated with the translator drive electrodes 56A and 58A and the gap distance between the stator drive electrodes 56B and 58B and the translator drive electrodes 56A and 58B within a certain range. The repeat distance is the distance between the center of a translator drive electrode 56A or 58A held at a particular voltage and the center of the nearest translator drive electrode 56A or 58A, respectively, held at approximately the same voltage. In the preferred embodiment, where every other translator drive electrode 56A or 58A is held at the same voltage, the repeat distance is twice the center-to-center spacing of the translator drive electrodes 56A and 58A, assuming that the spacing is constant. To minimize the forces in the Y-direction, it is desirable to keep the repeat distance divided by the distance between the stator drive electrodes 56B and 58B and the translator drive electrodes 56A and 58A below approximately sixteen.

Figure 8:
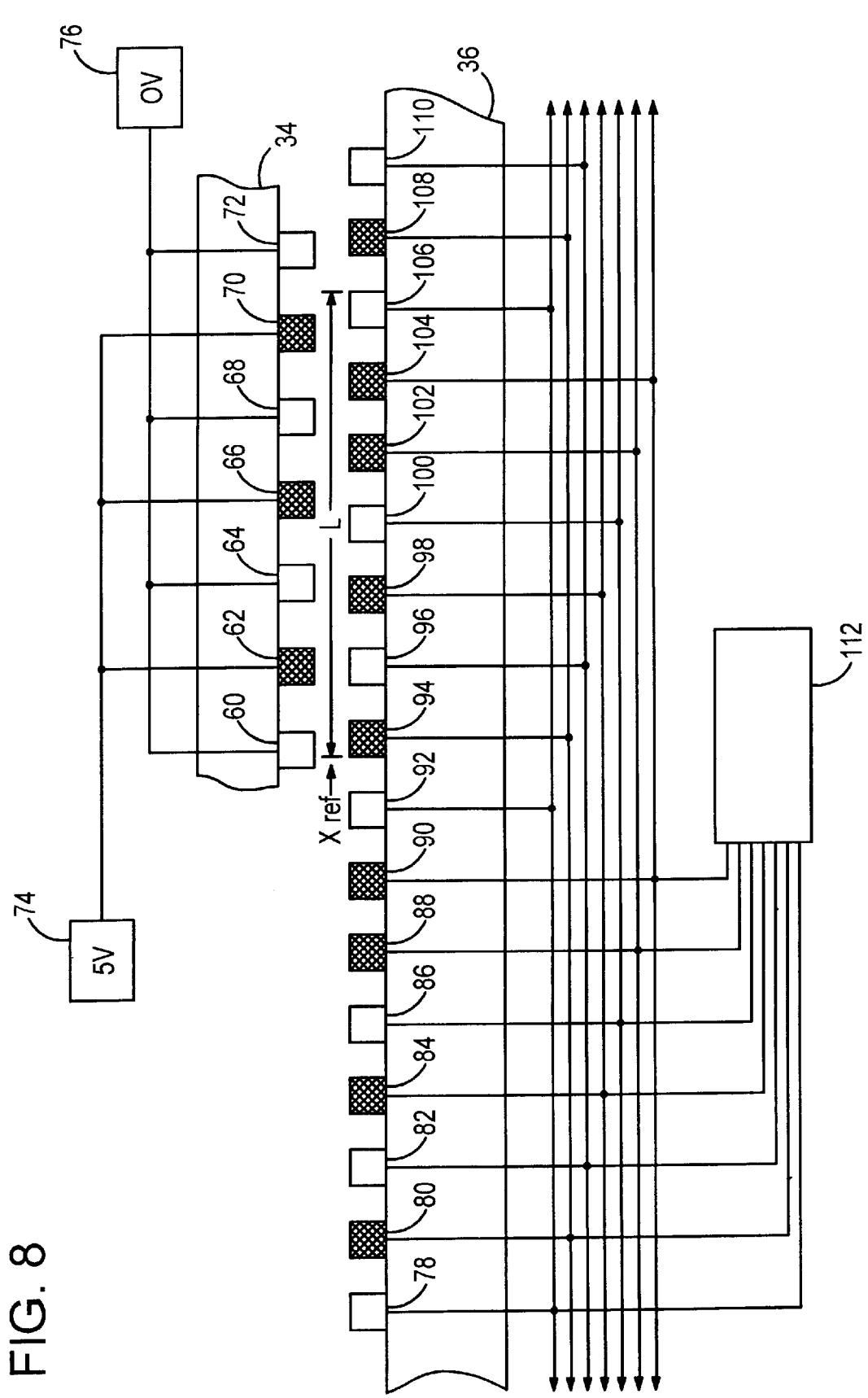
FIGS. 8–10 are cross-sectional views of the switching device of FIG. 2, illustrating changes in the voltage pattern of the stator electrodes that are responsible for laterally displacing the translator.

There are numerous ways to apply the voltages to the drive electrodes to generate and vary the electrostatic forces. An exemplary manner to generate and vary the electrostatic forces between the drive electrodes 56A, 56B, 58A and 58B to displace the translator 34 will now be described with reference to FIGS. 8, 9 and 10. In FIG. 8, cross-sectional segments of the translator 34 and the stator 36 are shown. The translator is illustrated with a number of translator electrodes 60, 62, 64, 66, 68, 70 and 72 that are electrically coupled to either a voltage source 74 or 76 in an alternating fashion. These translator electrodes represent the electrodes 56A or 58A. The voltage source 74 provides a constant voltage of positive five volts to the electrodes 62, 66 and 70, while the voltage source 76 provides a constant voltage of zero volts to electrodes 60, 64, 68 and 72. The stator 36 is illustrated with a number of stator electrodes 78, 80, 82, 84, 86, 88, 90, 92, 94, 96, 98, 100, 102, 104, 106, 108 and 110 that are coupled to a controller 112. The controller 112 selectively provides either zero volts or positive five volts to the stator electrodes 78–110. The translator electrodes 60–72 are spaced such that approximately six translator electrodes are situated for a specific length L, while approximately seven stator electrodes are situated for the same length L. Since the stator will remain stationary as the translator is laterally displaced, the left edge of the stator electrode 94 will be designated as a reference point $X_{ref}$.

Figure 9:
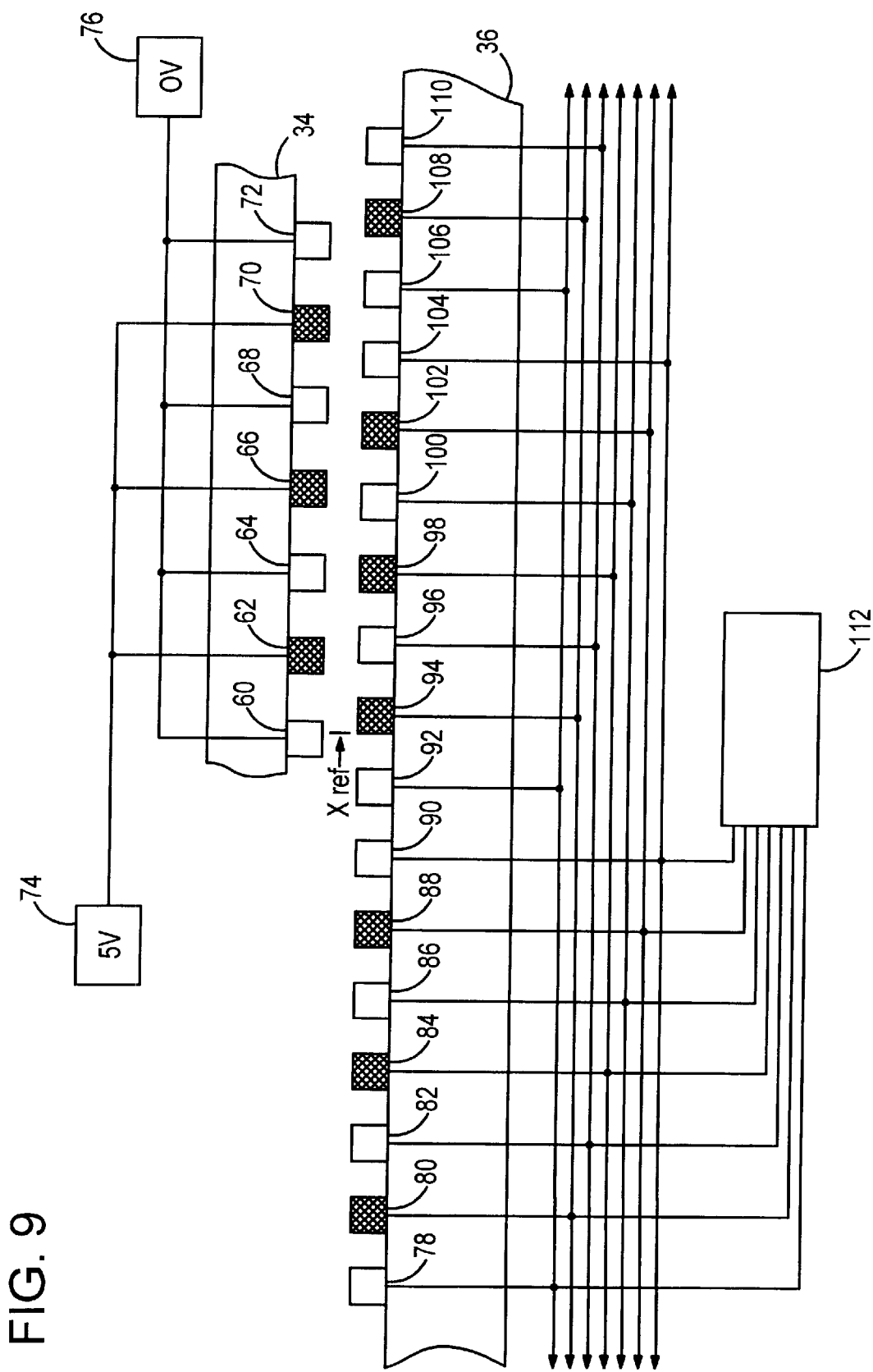
Figure 10:
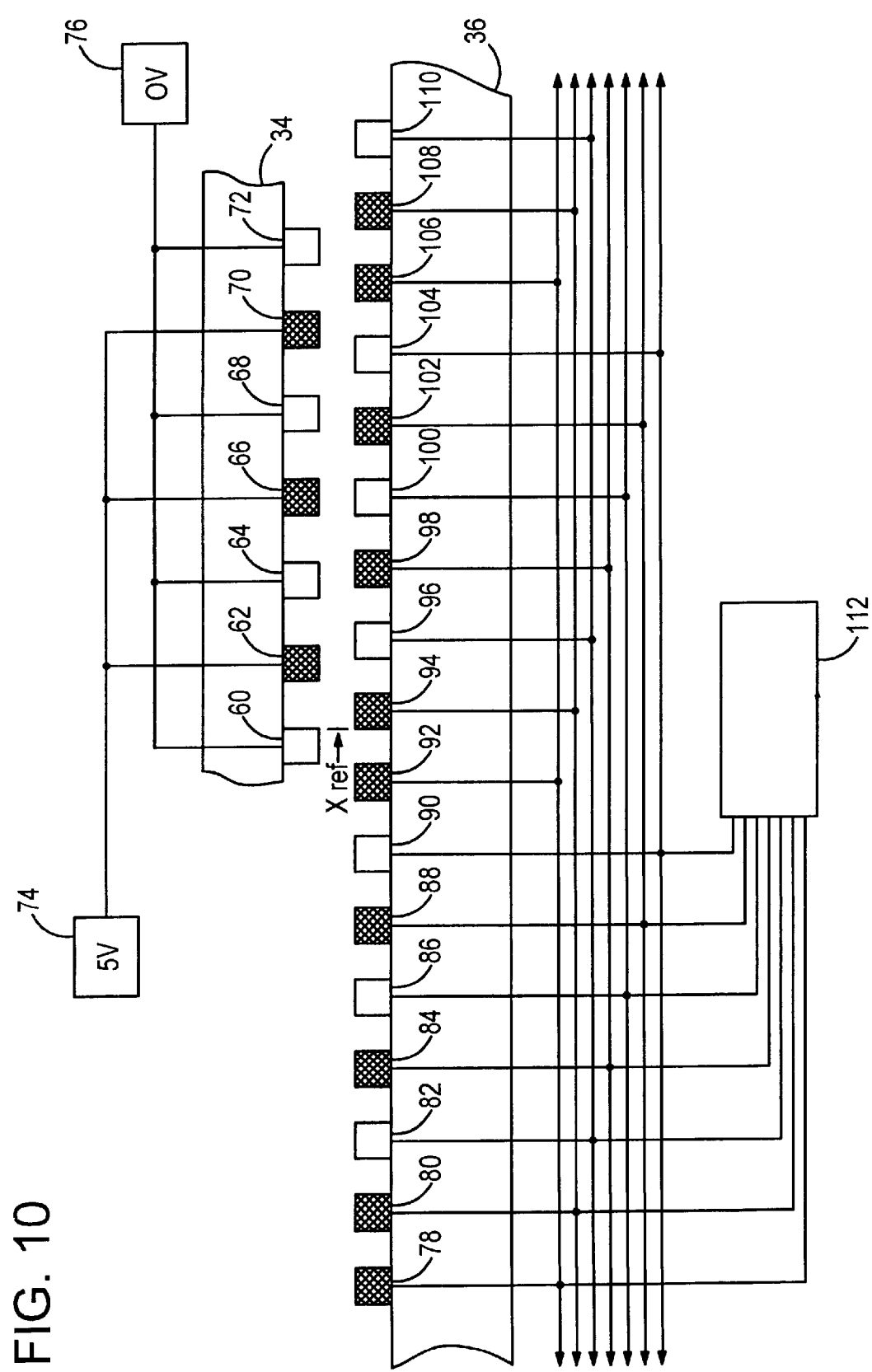

Initially, the controller 108 applies five volts to stator electrodes 76, 80, 84, 86, 90, 94, 98, 100 and 104, as shown in FIG. 8. The electrodes that are supplied with five volts have been cross-hatched to ease identification. In order to displace the stator 34 to the X-direction, i.e. to the left, every seventh stator electrode is switched from the original voltage of zero or five volts to the other voltage of zero or five volts by the controller 112. In this exemplary manner, the stator electrodes 90 and 104 have been switched from five volts to zero volts, as shown in FIG. 9. This change causes a net electrostatic force on the translator 34, which incrementally displaces the translator 34 in the X-direction. Next, every seventh stator electrode 78, 92 and 106 that is just right of the stator electrodes 90 and 104 that were previously switched are switched to further displace the translator in the X-direction. The stator electrodes 78, 92 and 106 are switched from zero volts to five volts by the controller 112. The resulting voltage pattern is shown in FIG. 10. Similar to the previous change, this change in the voltage pattern of the stator electrodes 78–110 incrementally displaces the translator in the X-direction. By continually switching the voltages for every seventh stator electrode in this fashion, the translator is further moved in the X-direction. However, there is a limit to the total displacement of the translator from its original position, due to the fact that the translator is physically coupled to the stator 36 by the flexures 40 and the translator supports 38.

Other configurations of drive electrodes and applied voltages are possible for applying lateral forces to the movable translator 34. The method of applying voltages described above is directly extendable to groups of electrodes in which the first set of electrodes is comprised of groups of 2*n electrodes and the second set of electrodes is comprised of groups of 2*n±1 electrodes. Similar to the above method, an alternating pattern of voltages is applied to the first set of electrodes and a basically alternating pattern of voltages is applied to the second set of electrodes. Because the second set of electrodes consists of groups of an odd number of electrodes, two electrodes in each group have the same voltage as one of their nearest neighbors. Similar to the above method, movement of the translator is induced by switching the voltage on the electrodes that have the same voltage as their nearest neighbor.

Other electrostatic surface drives are also applicable to this invention. One example is described by Higuchi et al. in U.S. Pat. No. 5,448,124. In this case, the pitches of the first and second set of drive electrodes are similar and three-phase temporally alternating voltages are applied to both the first and second sets of drive electrodes. The position of the translator is controlled by varying the phase difference between the three phase signals applied to the first and second sets of electrodes.

The repulsive forces that act as levitation forces to maintain the translator 34 at a distance from the stator 36 are generated by the translator levitator electrodes 48A and 50A and the stator levitator electrodes 48B and 50B. Preferably, the levitator electrodes 48A and 50A of the translator and the levitator electrodes 48B and 50B of the stator have the same pitch, such that each translator electrode 48A and 50A is positioned directly above one of the stator electrodes 48B and 50B. When the like voltages are applied to the translator electrode and the opposing stator electrode, a repulsive force is created between them. Since the lengths of the electrodes 48A, 48B, 50A and 50B are parallel to the X axis, the alignment between the translator electrodes 48A and 50A and the stator electrodes 48B and 50B will not be altered by the lateral displacement of the translator in the X-direction. Thus, the repulsive forces between the translator and the stator will generally be constant throughout the lateral displacement of the translator. As an example, the levitator electrodes 48A, 48B, 50A and 50B may have an alternating voltage pattern of zero volts and five volts to generate the repulsive forces. However, other low and high voltages may be applied to the levitator electrodes. In fact, the low and high voltages applied to the levitator electrodes of the translator need not be the same voltages applied to the levitator electrodes of the stator.

Figure 11:
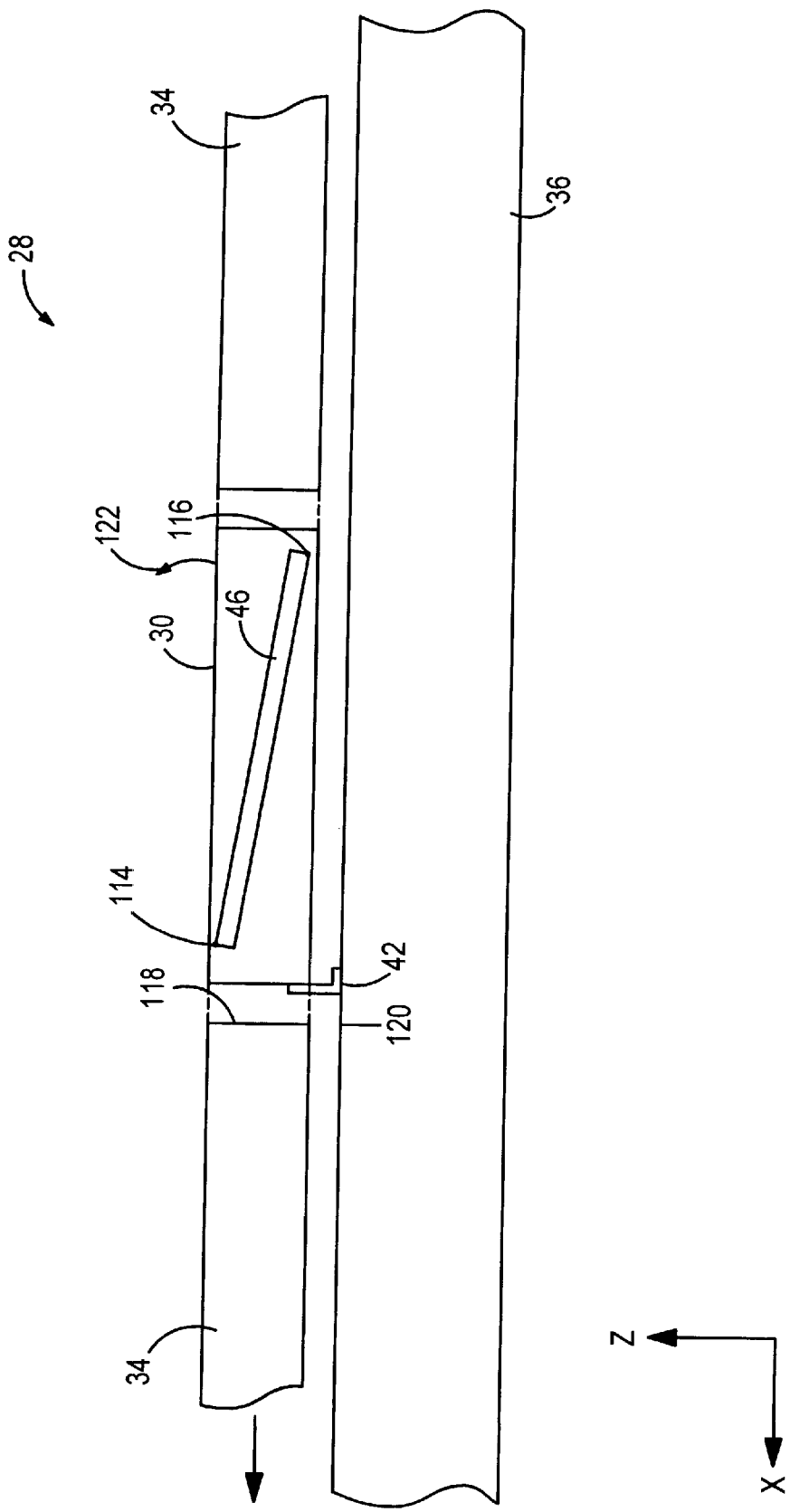
FIGS. 11–13 are cross-sectional views of the switching device of FIG. 2, illustrating the pivoting of a micromirror of the switching device as the translator is laterally displaced.
Figure 12:
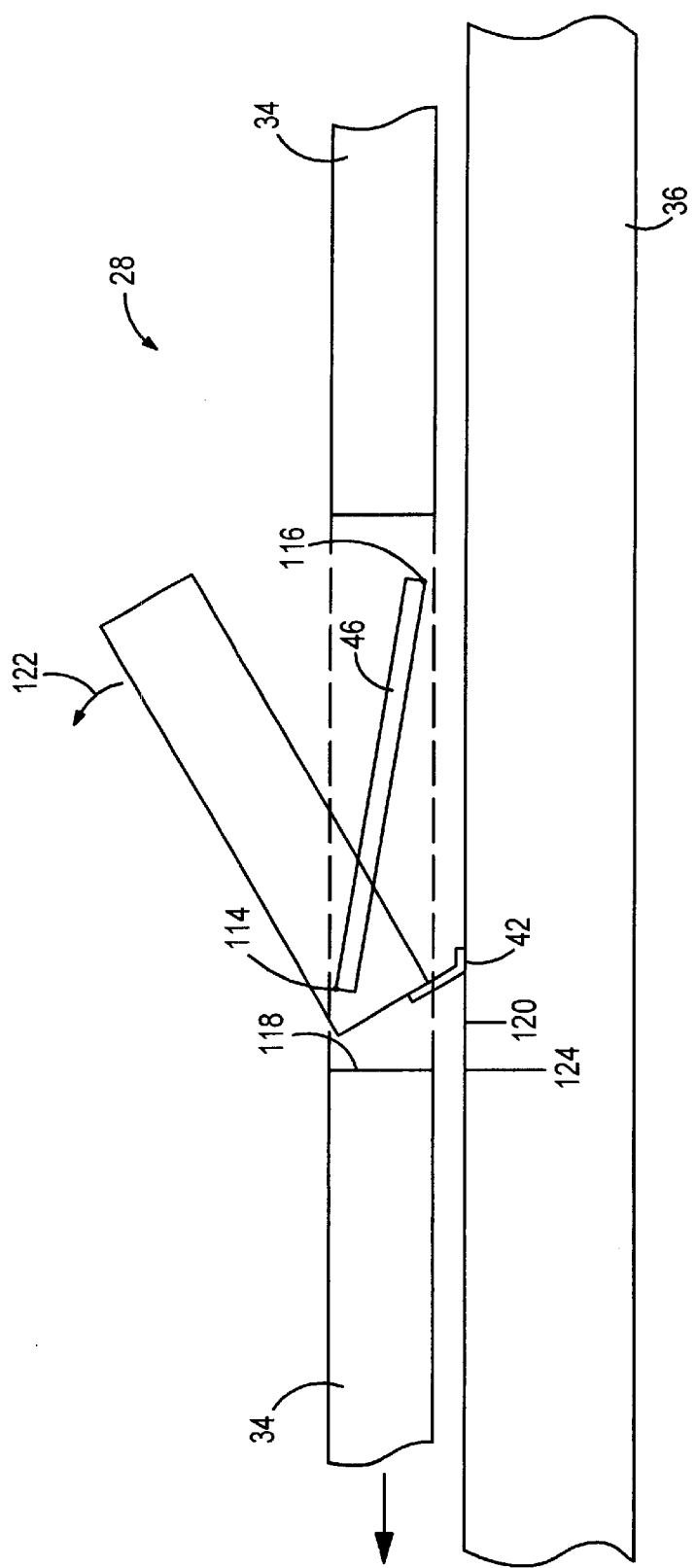
Figure 13:
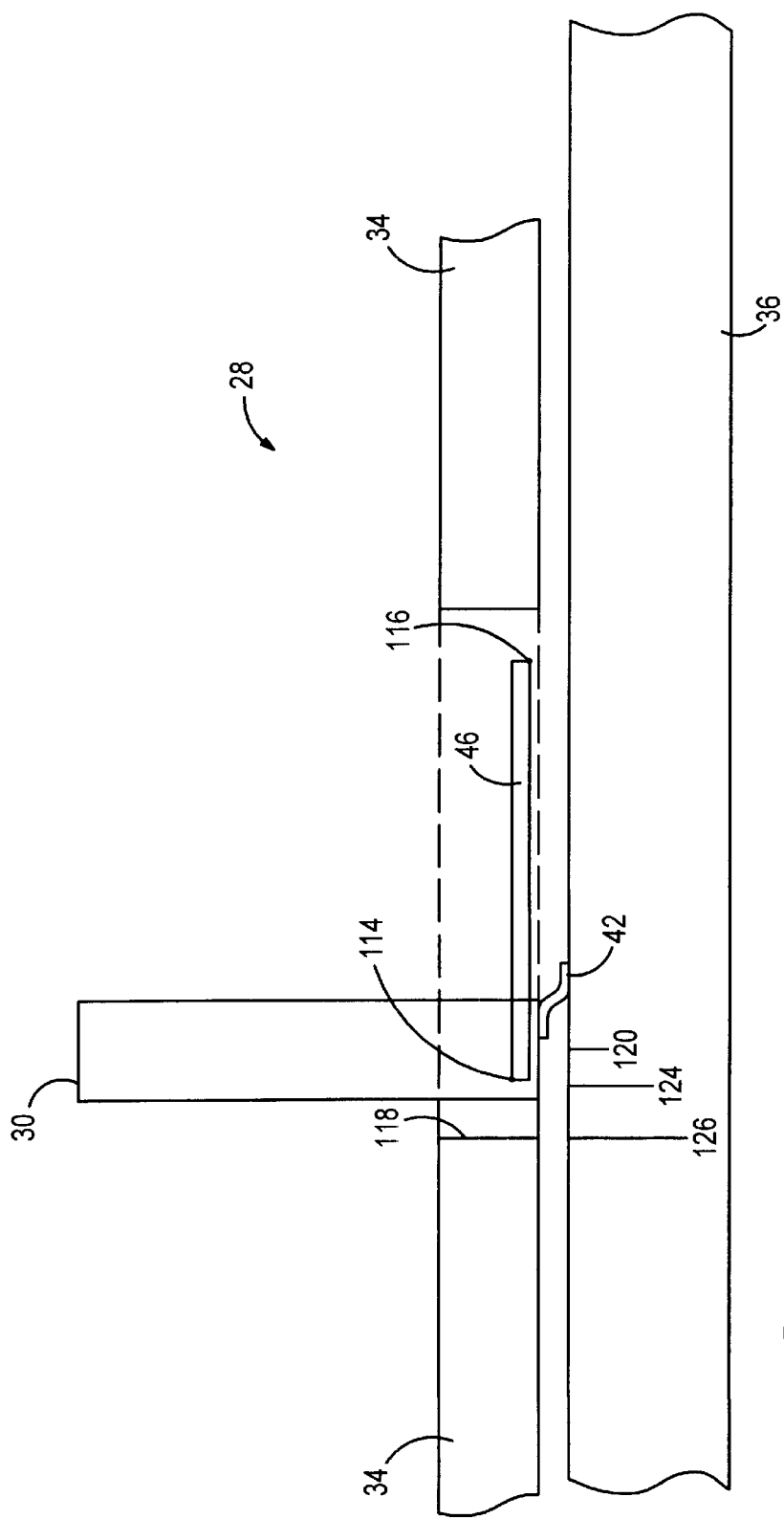

As stated above, the lateral displacement of the translator 34 induces the micromirror 30 to be positioned from the non-reflective orientation to the reflective position. The positioning process of the micromirror will now be described with reference to FIGS. 11, 12 and 13. FIGS. 11–13 are various cross-sectional views of the switching device 28, illustrating the pivoting of the micromirror as the translator is laterally displaced. The view point of FIGS. 11–13 is identical to the view point of FIG. 5. The dashed lines represent a portion of the translator that is not visible to the current view point. The actuation arm 46 is attached to the micromirror at a location 114 and is also attached to the dashed portion of the translator 34 at location 116. The actuation arm is preferably attached to the micromirror and the translator 34 by a flexible film, so that the actuation arm can rotate about the locations 114 and 116. For clarification, electrodes 56A, 56B, 58A and 58B are not shown in FIGS. 11–13. Furthermore, the reflective layer 52 and the mirror substrate 54 of the micromirror 30 are not shown.

In FIG. 11, the translator 34 is situated in the original position. The original position is the resting position of the translator, when there are no electrostatic forces generated between the translator and the stator 36. At the original position, an inner surface 118 of the translator is positioned directly over a reference line 120 on the stator. When electrostatic forces are initially generated by applying voltages to the electrodes 56A, 56B, 58A and 58B in a first voltage pattern, as illustrated in FIG. 8, the translator may shift slightly in either direction along the X-axis, until an equilibrium is reached. As the voltage pattern is reconfigured, as illustrated in FIGS. 9 and 10, the net electrostatic force along the X-axis displaces the translator to the left. Since the actuation arm 46 is attached to the translator at the location 116, the actuation arm will be pushed in the X-direction. The movement of the actuation arm creates a torque to pivot the micromirror in a direction of arrow 122, which is caused by the fact that the micromirror is attached to the actuation arm at the location 114 and is also attached to the stator 36 by the pivoting strip 42.

In FIG. 12, the translator 34 has been displaced such that the inner surface 118 of the translator 34 is now positioned over a reference line 124 on the stator 36. The displacement of the translator over the distance between the reference lines 120 and 124 has pivoted the micromirror 30 by a significant amount, as shown in FIG. 12. In FIG. 13, the micromirror has been pivoted to an upright position, i.e., the reflective orientation. In addition, the translator has been further displaced such that the inner surface 118 of the translator is now positioned over a reference line 126 on the stator. The micromirror is now in a state to reflect optical signals that are propagating along the X-axis.

The micromirror 30 can be incrementally repositioned to the non-reflective orientation, shown in FIG. 11 by displacing the translator 34 in the negative X-direction, such that the inner surface 118 of the translator 34 is positioned over the reference line 120 on the stator 36. The translator can be displaced in the negative X-direction by applying voltages to the stator drive electrodes 56B and 58B in the reverse sequence of the voltage patterns that were shown in FIGS. 8–10. In an alternative operation, the voltages that are applied to the drive electrodes 56A, 56B, 58A and 58B may be terminated to eliminate the electrostatic forces that are responsible for the lateral movement of the translator. When these electrostatic forces are removed, the flexures 40 of the translator will return to the normal state, thereby laterally displacing the translator to the original position.

Figure 14:
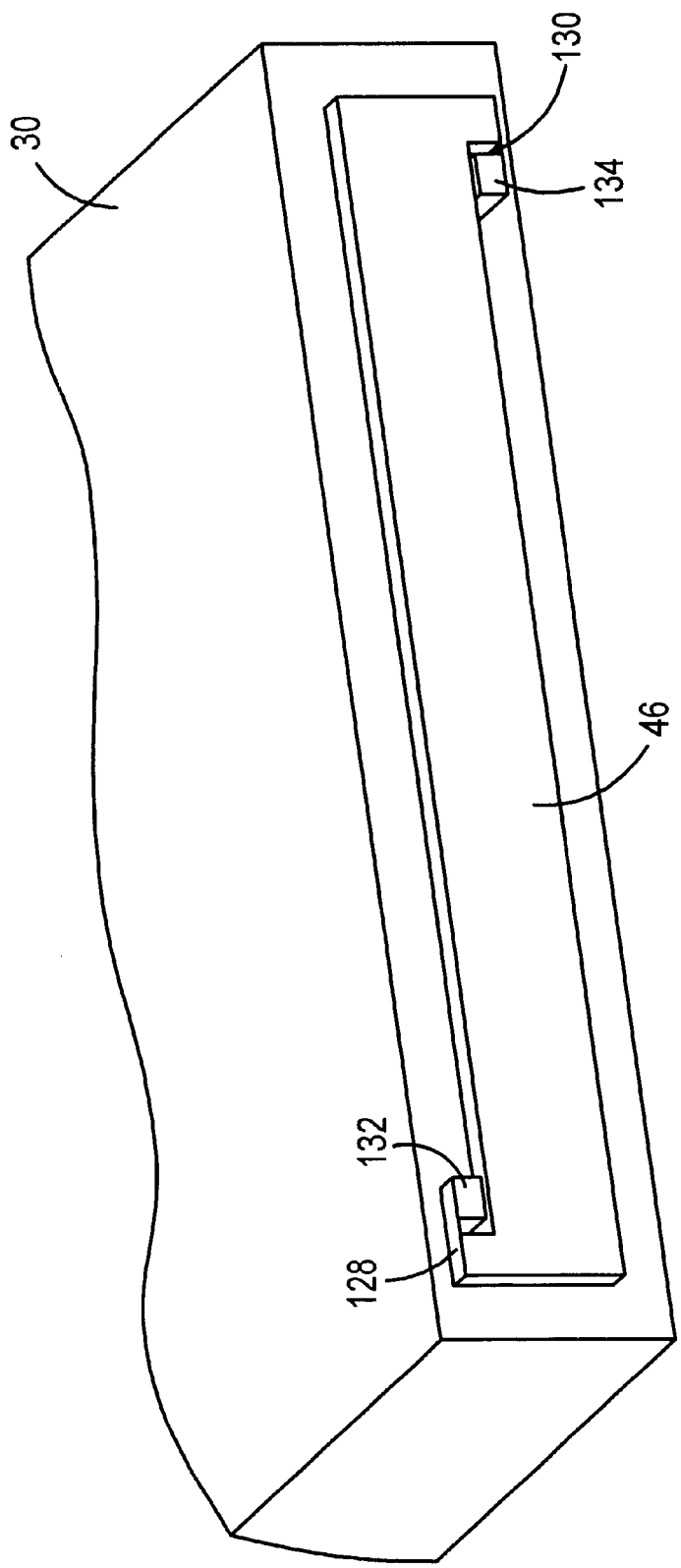
FIG. 14 is a perspective view of an actuation arm of the switching device of FIG. 2 in accordance with an exemplary embodiment.

Turning to FIG. 14, a detailed view of the actuation arm 46 in accordance with an exemplary embodiment is shown. The actuation arm 46 is attached to the micromirror 30 and the translator 34 (not shown in FIG. 14) by thin flexible films 128 and 130. The flexible films may be made of SiN. The material of the flexible films is not critical to the invention. The film 128 is attached to the actuation arm 46 and a protruding member 132 that is coupled to the micromirror. The film 130 is attached to the actuation arm and a protruding member 134 that is coupled to the translator. The films 128 and 130 allow the micromirror to pivot while the actuation arm rotates about the members 132 and 134.

Figure 15:
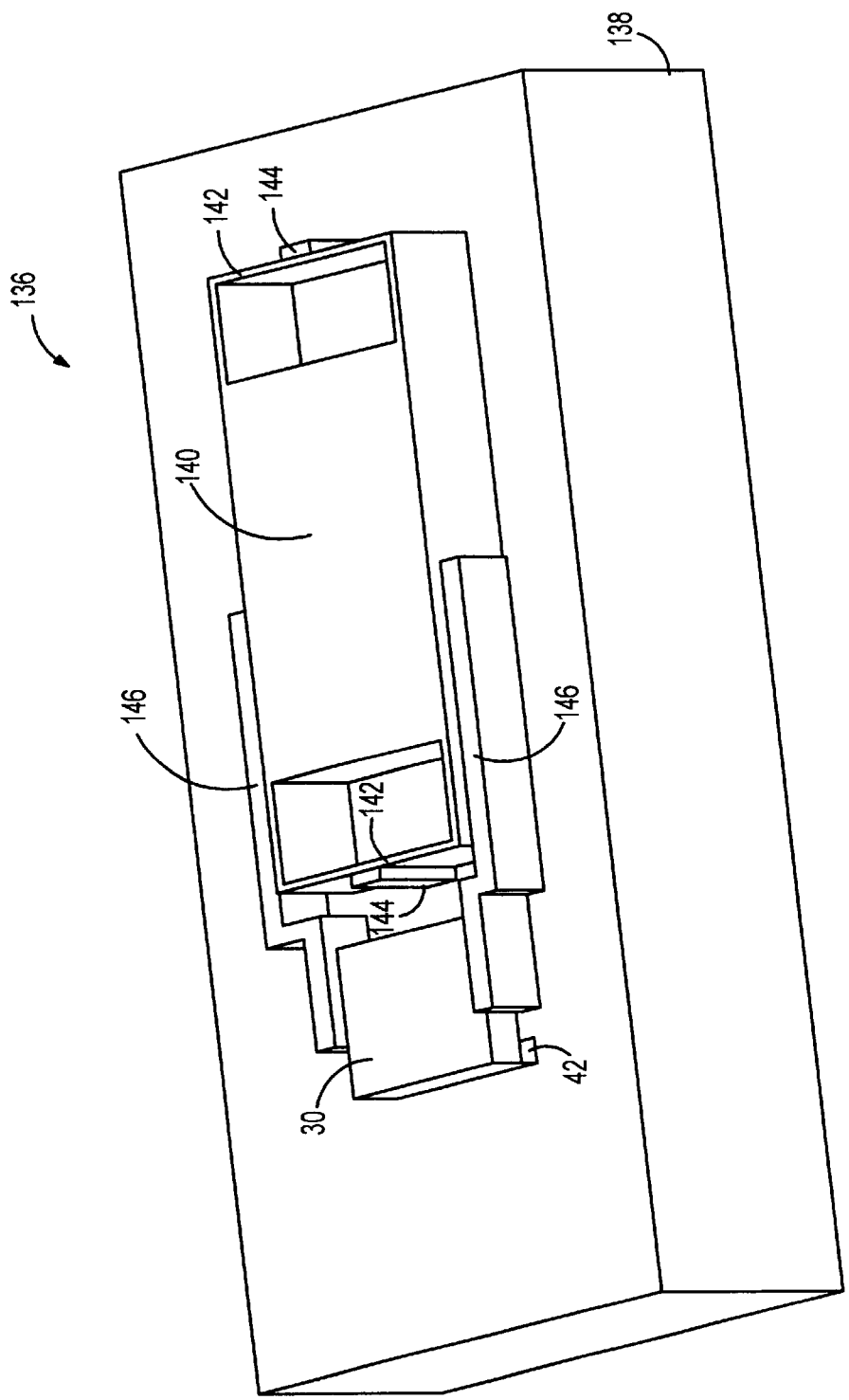
FIG. 15 is a perspective view of a switching device in accordance with a second embodiment of the present invention.

In FIG. 15, a switching device 136 of the optical device 10 in accordance with a second embodiment is shown. The same reference numerals of FIG. 2 will be used for the same components shown in FIG. 15. The switching device 136 includes a stator 138, a translator 140, and the micromirror 30. The translator and the stator may be made of silicon. Similar to the switching device 28, the switching device 136 operates to pivot the micromirror 30 between the non-reflective orientation and the reflective orientation by laterally displacing the translator with respect to the stator along the X-axis.

The micromirror 30 is attached to the stator 138 by the pivoting strip 42, which allows the micromirror to pivot about the strip. The translator 140 includes flexures 142 that are attached to translator supports 144. The translator supports 144 are affixed to the stator. However, the flexures allow the translator to move along the X-axis by bending when the translator is laterally displaced by electrostatic forces. The micromirror and the translator are mechanically coupled by a pair of actuation arms 146. When the translator is laterally displaced, the actuation arms force the micromirror to pivot to a different orientation. The actuation arms may be attached to the micromirror and the translator in the same manner as the actuation arm 46 of the switching device 28, as shown in FIG. 14. The only significant difference would be that the same sides of the actuation arms 146 are attached to the micromirror 30 and the translator 140. This difference does not change the operation of the actuation arms 146 to pivot the micromirror 30 between the reflective orientation and the non-reflective orientation.

Figure 16:
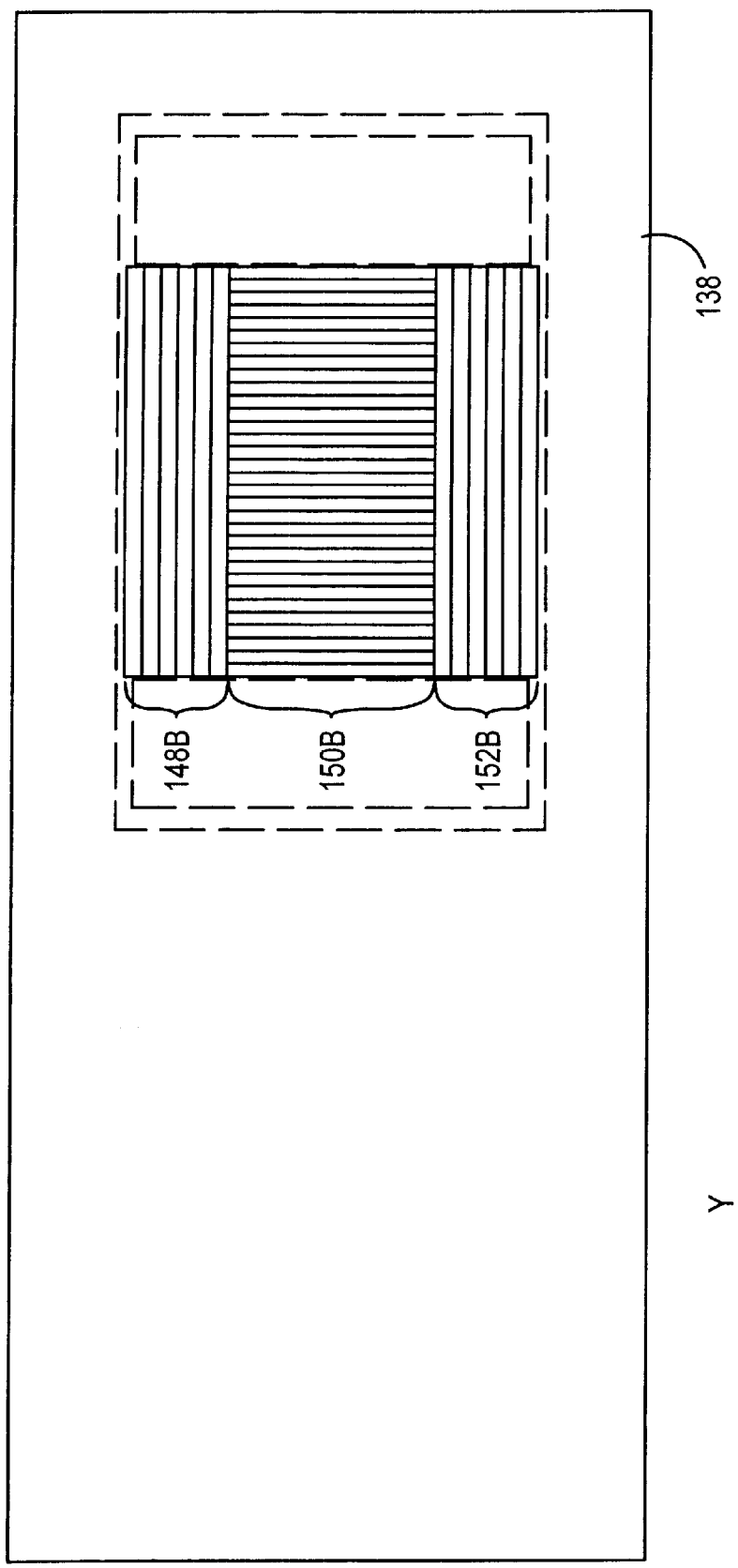
FIG. 16 is a top view of a stator of the switching device of FIG. 15, illustrating the configuration of stator electrodes on the upper surface of the stator.
Figure 17:
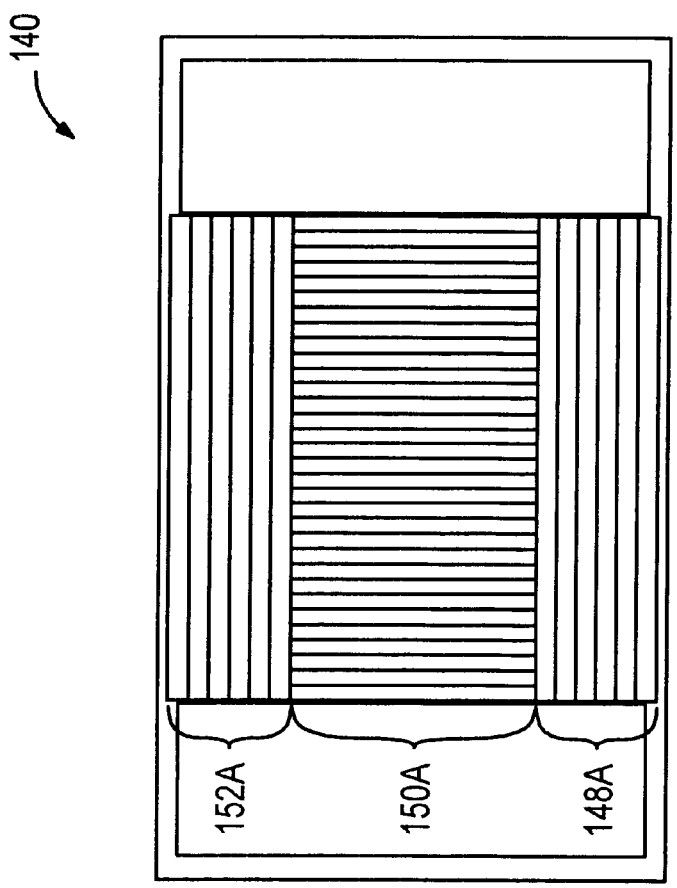
FIG. 17 is a bottom view of a translator of the switching device of FIG. 15, illustrating the configuration of translator electrodes on the lower surface of the translator.

Similar to the electrodes 48A, 48B, 50A, 50B, 56A, 56B, 58A and 58B of the switching device 28, the translator 140 and the stator 138 include sets of electrodes that generate electrostatic forces for displacement and levitation. Turning to FIG. 16, the upper surface of the stator 138 is shown. The stator includes sets of stator electrodes 148B, 150B and 152B. A dashed outline of the translator 140 is depicted on the surface of the stator 138 to illustrate the position of the translator with respect to the stator electrodes 148B, 150B and 152B. In FIG. 17, the lower surface of the translator 140 is shown. The translator includes sets of translator electrodes 148A, 150A and 152A. The translator electrodes 148A, 150A and 152A are positioned directly over the stator electrodes 148B, 150B and 152B, respectively, when the translator is in the original position over the stator. The translator electrodes 148A and 152A and the stator electrodes 148B and 152B are levitation electrodes that generate the repulsive forces to negate the attractive forces between the translator and the stator during the lateral displacement of the translator. The translator electrodes 150A and the stator electrodes 150B generate the electrostatic forces responsible for the lateral displacement of the translator.

In operation, voltages are applied to the electrodes 148A, 148B, 150A, 150B, 152A and 152B. Fixed voltages are applied to the electrodes 148A, 148B, 152A and 152B to generate the levitation forces, while the voltages that are applied to the electrodes 150A and 150B are selectively varied to generate the electrostatic forces that will laterally displace the translator 140. The fixed voltage pattern on the electrodes 148A, 148B, 152A and 152B may be identical to the fixed voltage pattern that is applied to the electrodes 48A, 48B, 50A and 50B of the switching device 28 in which voltages are applied in an alternating fashion of five volts and zero volts. The same voltage is applied to each translator electrode 148A and 152A and a stator electrode 148B and 152B that are vertically aligned, so that a repulsive force is created between them. The initial voltage pattern and the subsequent voltage patterns that are applied to the electrodes 150A and 150B to laterally displace the translator 140 may be identical to the voltage patterns that are applied to electrodes 56A, 56B, 58A and 58B of the switching device 28, as illustrated in FIGS. 8–10.

When the translator 140 is laterally displaced by the change of electrostatic forces between the electrodes 150A and 150B, the actuation arms 146 are also laterally displaced, since ends of the actuation arms are physically attached to the translator. The lateral displacement of the actuation arms pivots the micromirror 30 in the same manner as the actuation arms 46 of the switching device 28, as illustrated in FIGS. 11–13.

Figure 18:
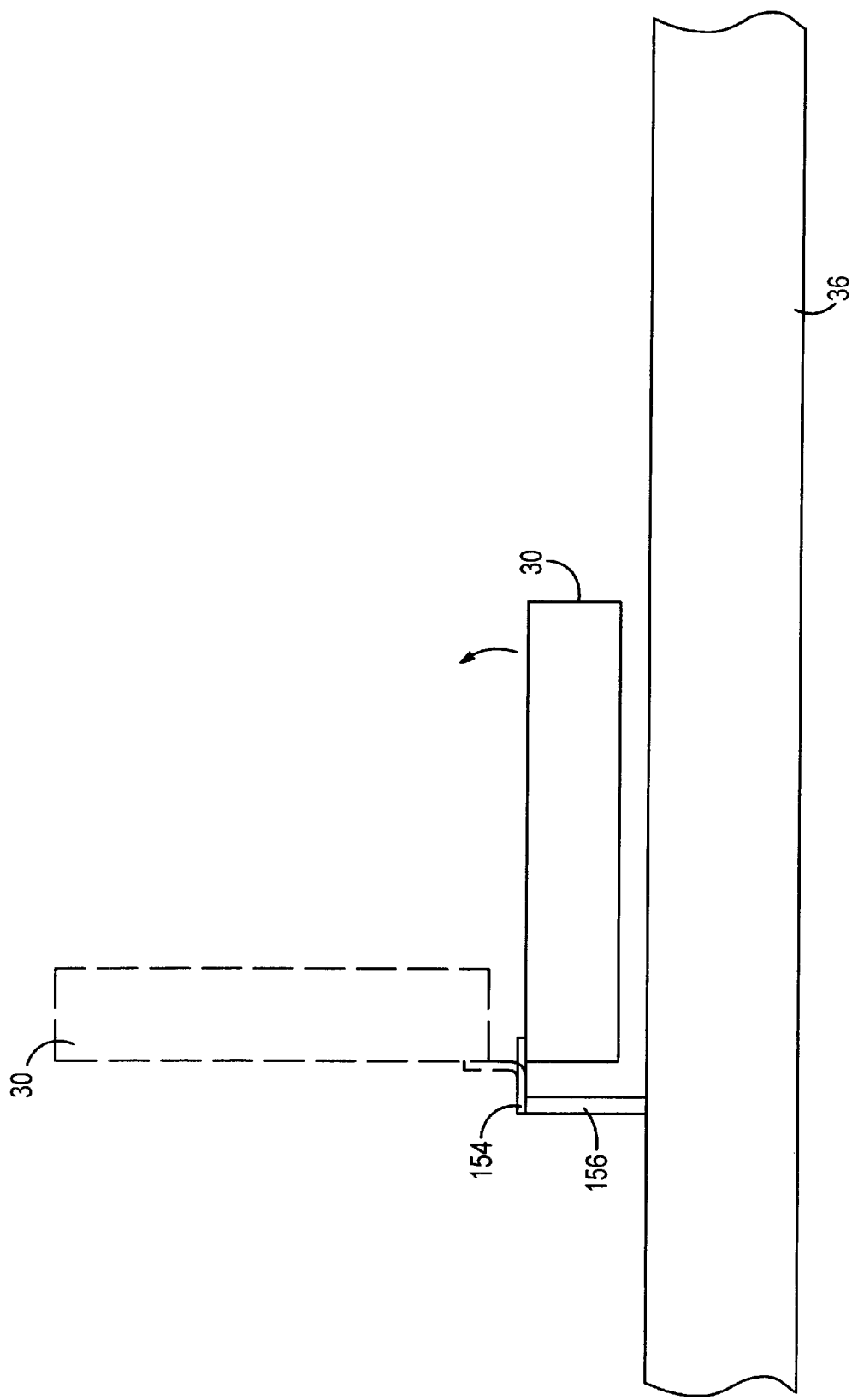
FIG. 18 is a diagram of a mirror pivoting mechanism in accordance with the invention.

The switching devices 28 and 136 may be structurally modified without affecting the overall operation of the devices. As an example, the mirror pivoting mechanism, i.e., the pivoting strip 42, may be modified, as shown in FIG. 18. In this modified version of the mirror pivoting mechanism, a pivoting strip 154 is attached to the upper surface of the micromirror 30, instead of the side or lower surface of the micromirror. The pivoting strip 154 is also attached to a support structure 156 that is affixed to the stator 36. The pivoting strip 154 allows the micromirror to pivot to the reflective orientation, as illustrated by the dotted outline of the micromirror. If the pivoting strip 154 and the support structure are implemented in the switching device 28, the support structure would be positioned on the stator such that it would be situated within the opening 44 of the translator 34.

Although the switching devices 28 and 136 have been described as being components of the optical switch 10, other applications of the switching devices 28 and 136 are contemplated. In both devices, the micromirror 30 can be incrementally pivoted by short lateral displacement of the translator 34 or 140. Consequently, an optical beam may be reflected to a number of different destinations by these switching devices. This feature allows the switching devices to function as beam steering devices. For example, the switching devices may be utilized to lock a signal beam to a receiver, to scatter a laser beam for UPC scanning, or to steer optical signals for demultiplexing.

Figure 19:
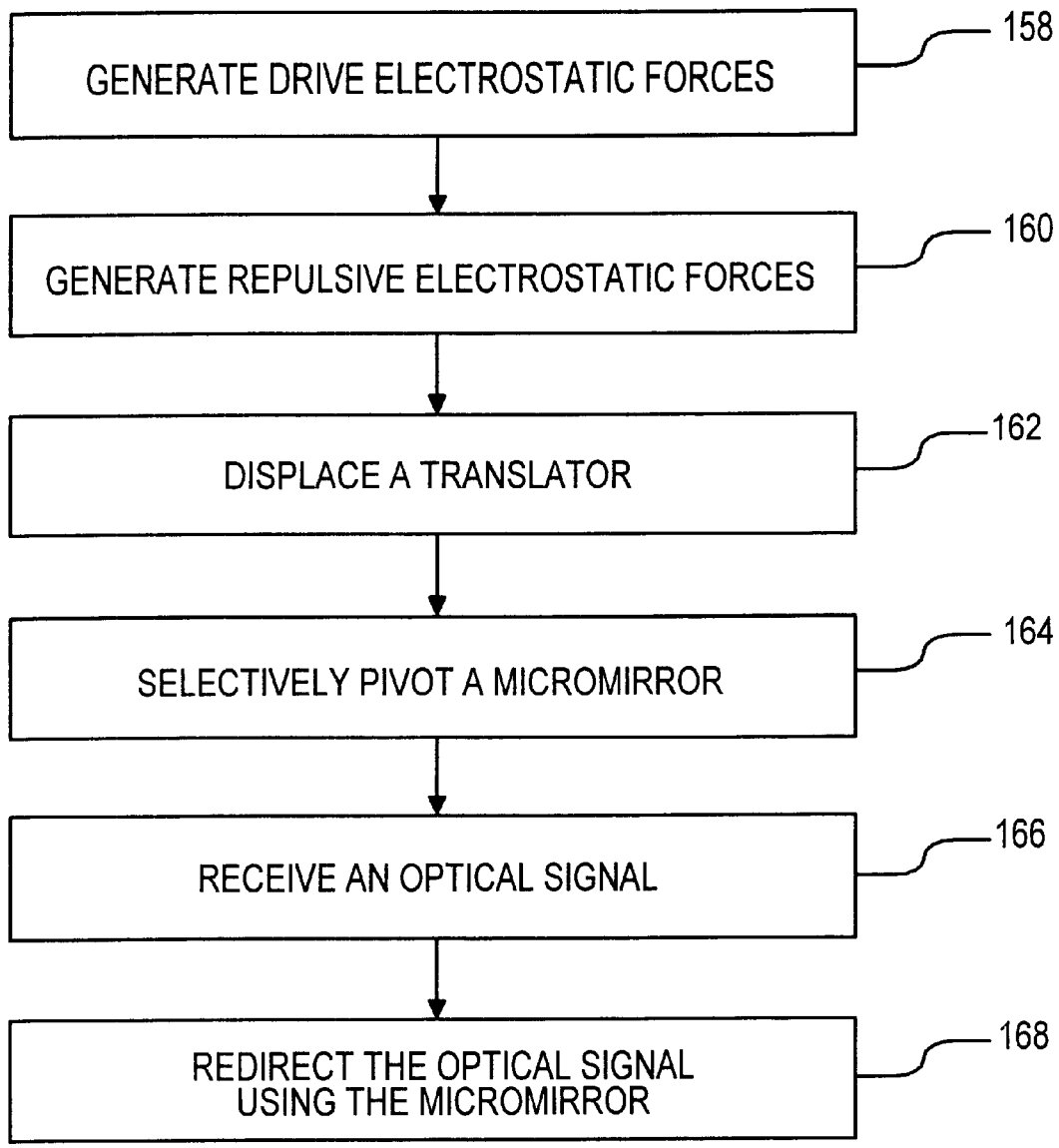
FIG. 19 is a flow diagram of a method of steering optical signals using an electrostatic actuator in accordance with the present invention.

A method of steering optical beams using a switching device in accordance with the invention will be described with reference to FIG. 19. At step 158, drive electrostatic forces are generated between a translator and a stator of the switching device. The translator and the stator define an electrostatic actuator. Next, at step 160, repulsive electrostatic forces that are normal to the opposing surfaces of the translator and the stator are generated. The repulsive forces operate to negate any induced attractive forces between the translator and the stator. At step 162, the translator is laterally displaced by changing the drive electrostatic forces. A micromirror of the switching device is then selectively pivoted by the displaced translator to the reflective orientation from the non-reflective orientation, at step 164. Preferably, the translator is physically coupled to the micromirror such that lateral displacement of the translator mechanically pivots the micromirror. At step 166, an optical signal from a first optical fiber is received by the switching device. The optical signal propagates toward the micromirror. At step 168, the optical signal is reflected by the micromirror, thereby redirecting the optical signal to a second optical fiber.

What is claimed is:

1. An optical switch for manipulating an optical beam comprising:
    a first member;
    a second member supported in spaced relation from a surface of said first member by flexures;
    arrays of electrodes distributed along each of said first and second members to enable electrostatic drive forces to selectively displace said second member relative to said first member; and
    a reflector connected to each of said first and second members to pivot about a pivot axis that is generally parallel to said surface of said first member as responses to relative displacements between said first and second members, said reflector having a plurality of operation positions, including at least one operation position within a path of said optical beam.

2. The optical switch of claim 1 wherein said reflector resides within an interior region of said second member.

3. The optical switch of claim 2 wherein said second member is a movable member and said first member is a stationary member, said movable member having an opening in which said reflector is seated.

4. The optical switch of claim 1 wherein said reflector is mounted to said second member by a strip of flexible material that defines said pivot axis.

5. The optical switch of claim 4 wherein said strip of flexible material is silicon nitride.

6. The optical switch of claim 1 wherein said arrays of electrodes include electrostatic drive electrodes on each of said first and second members.

7. The optical switch of claim 6 wherein said arrays of electrodes further include levitation electrodes on each of said first and second members, said levitation electrodes being generally perpendicular to said electrostatic drive electrodes.

8. The optical switch of claim 6 further comprising a means for stepping a pattern of voltages along at least one of said arrays of electrostatic drive electrodes of said first and second members.

9. The optical switch of claim 1 further comprising a source of said optical beam, said source being a fiber.

10. An optical switch comprising:
    an input path for an optical beam;
    a pivoting reflector having first and second positions, at least one of said first and second positions being along said input path;

a first member, said pivoting reflector being mounted to said first member to pivot between said first and second positions along a pivot region that is generally parallel to said first member; and a second member connected to said first member to enable substantially linear movement parallel to said first member, said second member being connected to said pivoting reflector to induce said pivot between said first and second positions in response to said substantially linear movement, said first and second members having an electrostatic-drive relationship such that said substantially linear movement is induced by electrostatic forces generated therebetween.

11. The optical switch of claim 10 wherein said pivoting reflector is mounted to said first member by a flexible strip of material which forms said pivot region.

12. The optical switch of claim 11 wherein said flexible strip is silicon nitride.

13. The optical switch of claim 10 wherein said first member is stationary and includes a first plurality of electrostatic drive electrodes and wherein said second member is a movable member having a second plurality of electrostatic drive electrodes that are responsive to voltage patterns along said first plurality.

14. The optical switch of claim 13 wherein said first and second members are spaced apart by flexures which have flexing characteristics which enable said substantially linear movement.

15. The optical switch of claim 10 wherein said second member has an interior region in which said pivoting reflector is supported.

16. The optical switch of claim 15 wherein said first position of said pivoting reflector is one in which said pivoting reflector is misaligned with said input path.

17. The optical switch of claim 16 wherein said input path includes wave-guides formed of materials on said first member.

* * * * *